US012641008B2

(12) United States Patent
Guo et al.

(10) Patent No.: US 12,641,008 B2
(45) Date of Patent: May 26, 2026

(54) MULTI-TOPOLOGY ROUTING IN NEXT GENERATION IoT NETWORKS

(71) Applicants: Mitsubishi Electric Research Laboratories, Inc., Cambridge, MA (US); Mitsubishi Electric Corporation, Tokyo (JP)

(72) Inventors: Jianlin Guo, Newton, MA (US); Kieran Parsons, Gloucester, MA (US); Philip Orlik, Cambridge, MA (US); Takenori Sumi, Tokyo (JP); Yukimasa Nagai, Tokyo (JP); Yuki Kawashima, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 18/430,939

(22) Filed: Feb. 2, 2024

(65) Prior Publication Data

US 2025/0158917 A1     May 15, 2025

Related U.S. Application Data

(60) Provisional application No. 63/598,582, filed on Nov. 14, 2023.

(51) Int. Cl.
*G06F 15/173* (2006.01)
*H04L 45/00* (2022.01)
(Continued)

(52) U.S. Cl.
CPC ............ *H04L 45/14* (2013.01); *H04L 45/123* (2013.01); *H04L 45/74* (2013.01)

(58) Field of Classification Search
CPC ........ H04L 45/14; H04L 45/123; H04L 45/74
See application file for complete search history.

(56) References Cited

U.S. PATENT DOCUMENTS

2025/0023811 A1*   1/2025   Thubert ................ H04L 47/829

OTHER PUBLICATIONS

Gaitan et al. EDF Scheduling and Minimal Overlap Shortest PAth Routing for Real Time TSCH Networks., Second Workshop on Next Generation Real Time Embedded Systems NG RES 2021. No. 2, pp. 2:1-2:12, open access series on informatics.

(Continued)

*Primary Examiner* — Joseph R Maniwang
(74) *Attorney, Agent, or Firm* — Gene Vinokur

(57) ABSTRACT

A node device for forming a multi-hop network is provided. The node device is configured to discover two routing topologies, a regular routing topology for regular data delivery and a priority topology for priority data delivery. The regular routes are discovered for all data nodes in an IoT network and priority routes are discovered for priority data nodes only. The regular data routes (D-Routes) are discovered using a distance based route discovery protocol RPL and the priority routes (P-Routes) are optimally discovered for priority data nodes only to minimize route overlap, route transmission time and route length. The node device includes a transceiver configured to receive and transmit regular data in a Destination Oriented Directed Acyclic Graph (DODAG) based topology and priority data in an optimal routing topology, a memory configured to store computer executable programs including a communication mode (CM), multi-rate link count (MLC), degree of route overlap (DRO), neighbor information, route transmission time and route length, and a processor configured to perform steps of the computer executable programs. The steps include discovering D-Routes and discovering P-Routes, which in turn includes acyclic route discovery, minimal (Continued)

Nodes in a next generation wireless IoT network — 200

210 — Data nodes

220 — Data concentrator

230 — Multi-mode node

240 — Current generation data nodes

260 — Next generation data nodes

250 — Single-mode regular data nodes

270 — Multi-mode regular data nodes

280 — Single-mode priority data nodes

290 — Multi-mode priority data nodes overlap route discovery, minimal transmission time route discovery and minimal length route discovery.

20 Claims, 11 Drawing Sheets

(51) Int. Cl.
*H04L 45/12* (2022.01)
*H04L 45/74* (2022.01)

(56) References Cited

OTHER PUBLICATIONS

Chondrogiannis et al. Alternative Routing: k-Shortest Paths with Limited Overlap., Nov. 2015 DOI: 10.1145/2820783.2820858, Conference: SIGSPATIAL.

Chondrogiannis et al. Finding k-shortest paths with limited overlap., The VLDB Journal 2020 29:1023-1047. http://doi.org/10.1007/s00778-020-00604-x.

* cited by examiner

Node 11 is a non-end node for sub-route 10→4,
but it is an end-node for sub-route 4→5

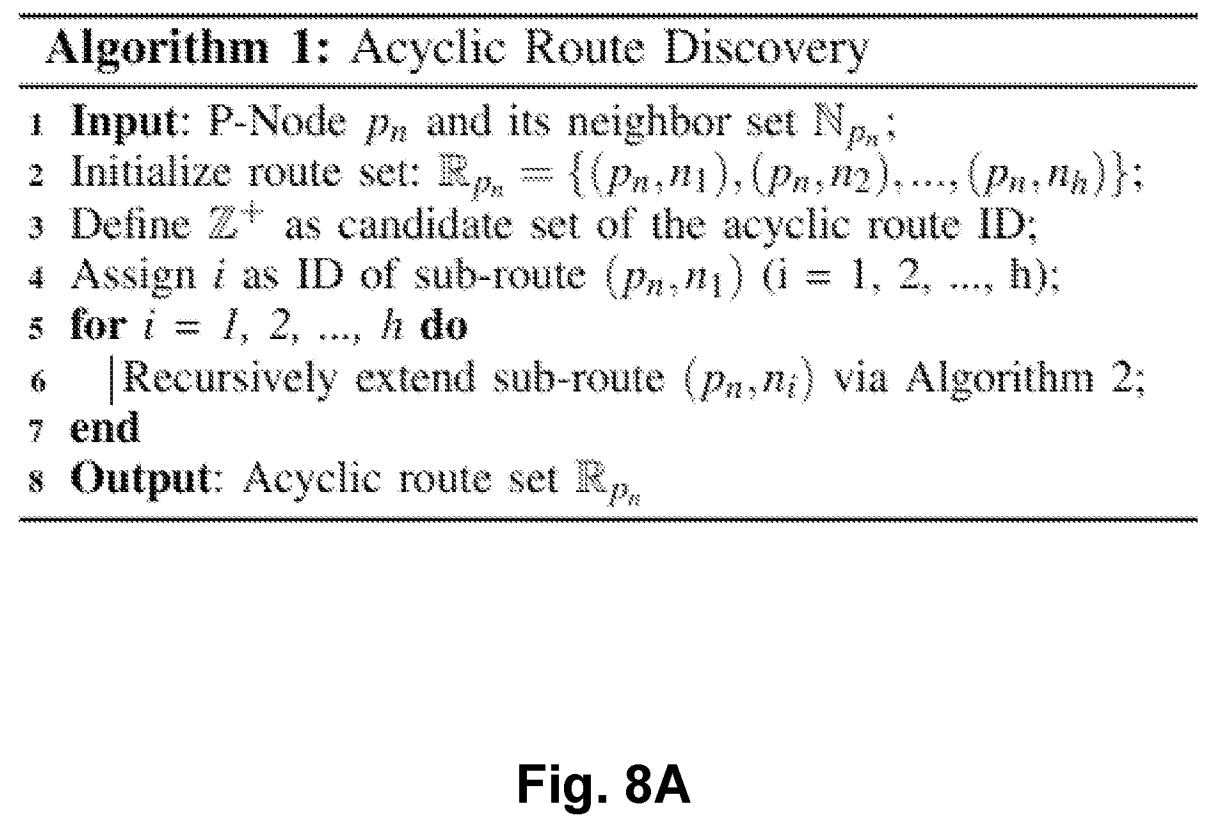

Algorithm 1: Acyclic Route Discovery

1 Input: P-Node $p_n$ and its neighbor set $N_{p_n}$;

2 Initialize route set: $R_{p_n} = \{(p_n, n_1), (p_n, n_2), ..., (p_n, n_h)\}$;

3 Define $Z^+$ as candidate set of the acyclic route ID;

4 Assign $i$ as ID of sub-route $(p_n, n_1)$ ($i = 1, 2, ..., h$);

5 for $i = 1, 2, ..., h$ do

6 | Recursively extend sub-route $(p_n, n_i)$ via Algorithm 2;

7 end

8 Output: Acyclic route set $R_{p_n}$

Fig. 8A

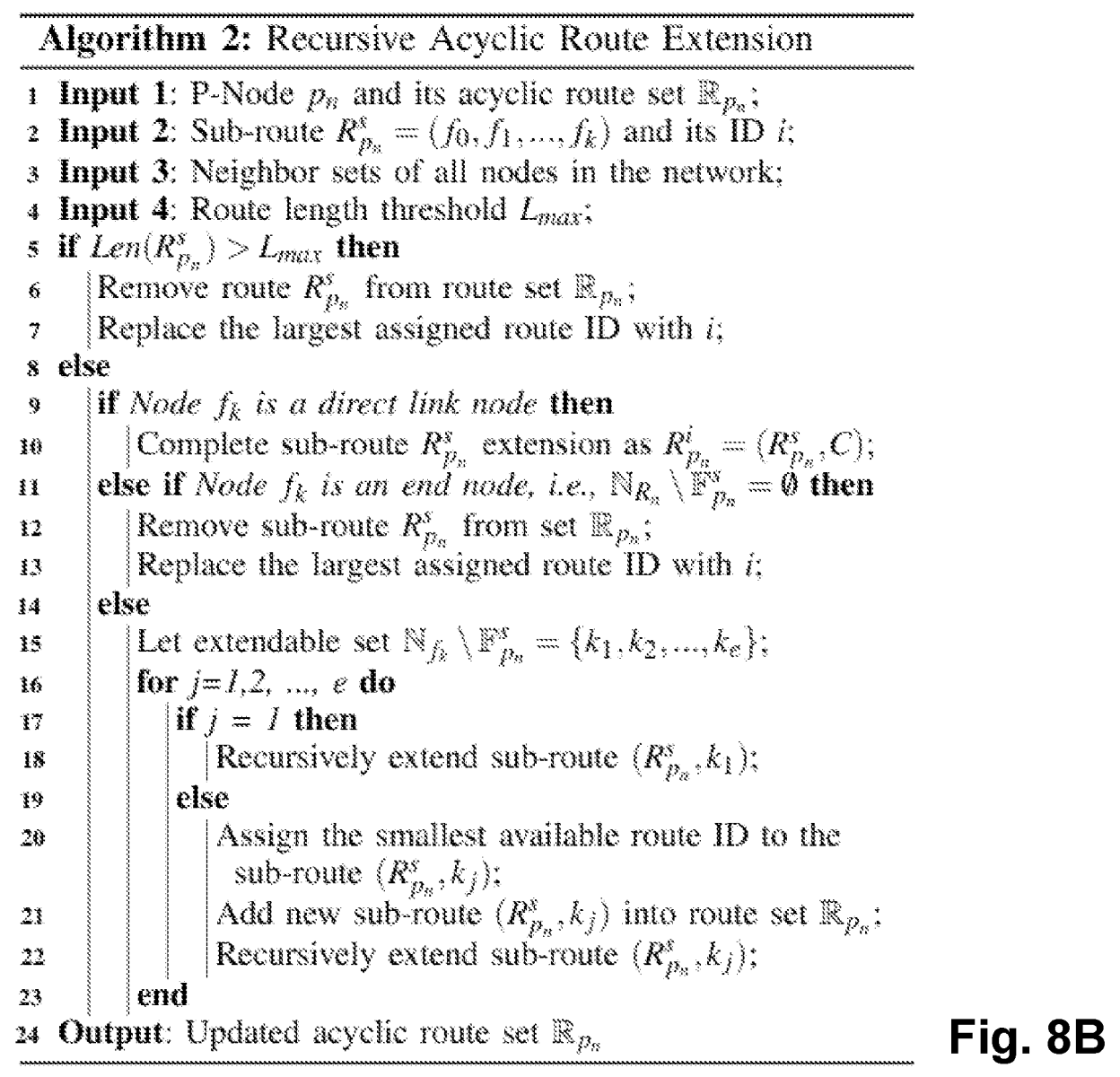

Algorithm 2: Recursive Acyclic Route Extension

1  Input 1: P-Node $p_s$ and its acyclic route set $\mathbb{R}_{p_s}$;
2  Input 2: Sub-route $R_{p_s}^s = (f_0, f_1, ..., f_k)$ and its ID $i$;
3  Input 3: Neighbor sets of all nodes in the network;
4  Input 4: Route length threshold $L_{max}$;
5  if $Len(R_{p_s}^s) > L_{max}$ then
6  | Remove route $R_{p_s}^s$ from route set $\mathbb{R}_{p_s}$;
7  | Replace the largest assigned route ID with $i$;
8  else
9  | if *Node $f_k$ is a direct link node* then
10 | | Complete sub-route $R_{p_s}^s$ extension as $R_{p_s}^t = (R_{p_s}^s, C)$;
11 | else if *Node $f_k$ is an end node*, i.e., $N_{R_k} \backslash \mathbb{F}_{p_s}^{r_k} = \emptyset$ then
12 | | Remove sub-route $R_{p_s}^s$ from set $\mathbb{R}_{p_s}$;
13 | | Replace the largest assigned route ID with $i$;
14 | else
15 | | Let extendable set $N_{f_k} \backslash \mathbb{F}_{p_s}^{r_k} = \{k_1, k_2, ..., k_e\}$;
16 | | for $j = 1, 2, ..., e$ do
17 | | | if $j = 1$ then
18 | | | | Recursively extend sub-route $(R_{p_s}^s, k_1)$;
19 | | | else
20 | | | | Assign the smallest available route ID to the sub-route $(R_{p_s}^s, k_j)$;
21 | | | | Add new sub-route $(R_{p_s}^s, k_j)$ into route set $\mathbb{R}_{p_s}$;
22 | | | | Recursively extend sub-route $(R_{p_s}^s, k_j)$;
23 | | end
24 Output: Updated acyclic route set $\mathbb{R}_{p_s}$

Fig. 8B

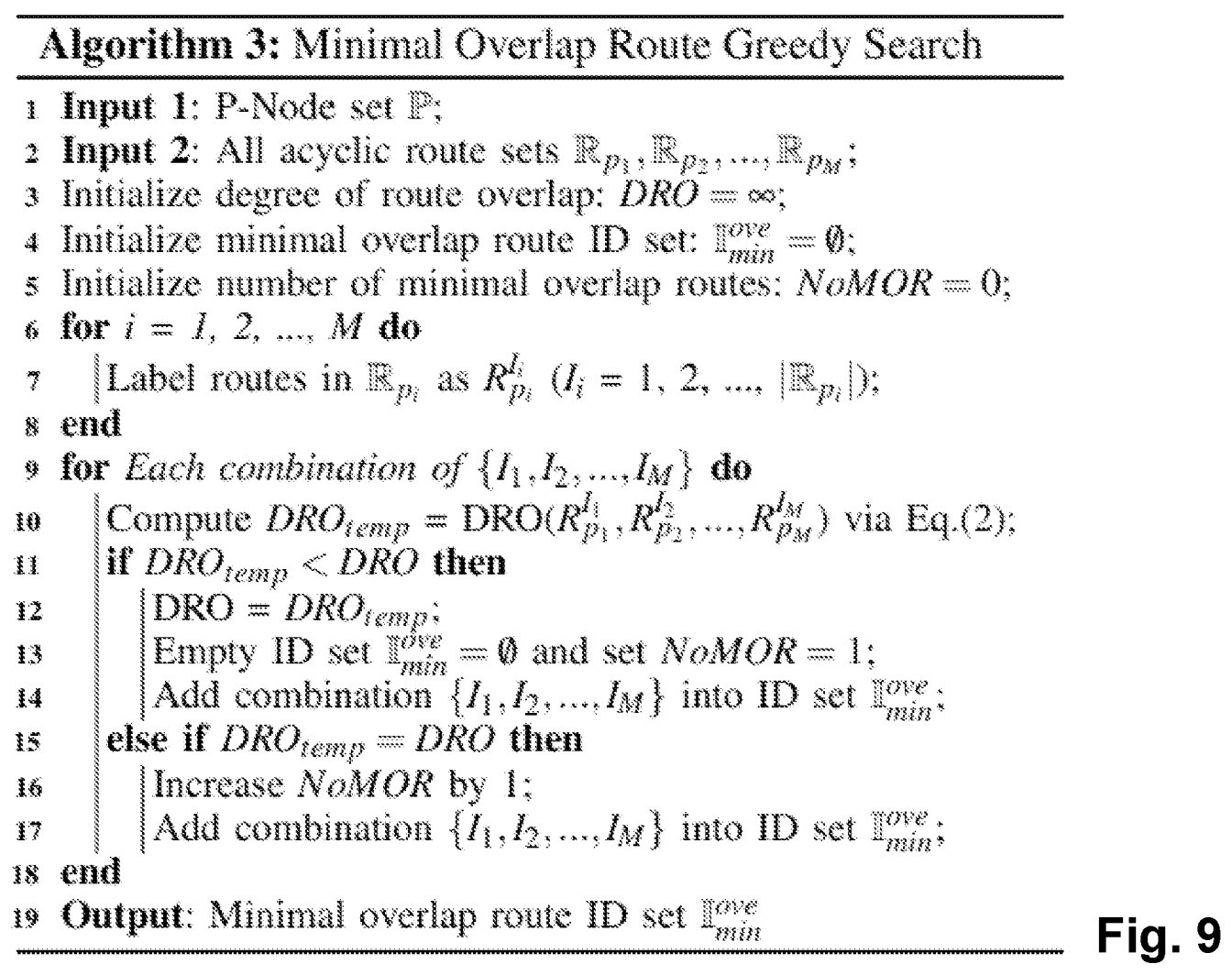

Algorithm 3: Minimal Overlap Route Greedy Search

1 Input 1: P-Node set $\mathbb{P}$;
2 Input 2: All acyclic route sets $\mathbb{R}_{p_1}, \mathbb{R}_{p_2}, \ldots, \mathbb{R}_{p_M}$;
3 Initialize degree of route overlap: $DRO = \infty$;
4 Initialize minimal overlap route ID set: $\mathbb{I}^{ove}_{min} = \emptyset$;
5 Initialize number of minimal overlap routes: $NoMOR = 0$;
6 for $i = 1, 2, \ldots, M$ do
7     Label routes in $\mathbb{R}_{p_i}$ as $R^{I_i}_{p_i}$ ($I_i = 1, 2, \ldots, |\mathbb{R}_{p_i}|$);
8 end
9 for *Each combination of* $\{I_1, I_2, \ldots, I_M\}$ do
10     Compute $DRO_{temp} = DRO(R^{I_1}_{p_1}, R^{I_2}_{p_2}, \ldots, R^{I_M}_{p_M})$ via Eq.(2);
11     if $DRO_{temp} < DRO$ then
12        $DRO = DRO_{temp}$;
13        Empty ID set $\mathbb{I}^{ove}_{min} = \emptyset$ and set $NoMOR = 1$;
14        Add combination $\{I_1, I_2, \ldots, I_M\}$ into ID set $\mathbb{I}^{ove}_{min}$;
15     else if $DRO_{temp} = DRO$ then
16        Increase $NoMOR$ by 1;
17        Add combination $\{I_1, I_2, \ldots, I_M\}$ into ID set $\mathbb{I}^{ove}_{min}$;
18 end
19 Output: Minimal overlap route ID set $\mathbb{I}^{ove}_{min}$;

Fig. 9

MULTI-TOPOLOGY ROUTING IN NEXT GENERATION IoT NETWORKS

FIELD OF THE INVENTION

This invention relates generally to routing data in wireless communication networks, and particularly to routing heterogeneous data in next generation wireless communication networks.

BACKGROUND OF THE INVENTION

As 5G and beyond communication technologies are emerging, the consumer wireless devices are evolving from current generation to next generation. The next generation wireless devices can support multiple communication modes/interfaces and performing more functions. During the evolution phase, it is impractical to completely replace the deployed current generation devices with next generation devices. Accordingly, the next generation wireless networks will consist of the mixed current and next generation nodes. As a result, how to efficiently route diverse data in the next generation wireless networks needs to be addressed since existing routing protocols are typically designed for the current generation networks.

Accordingly, it is desirable to provide new routing architecture to deliver diverse data in the next generation IoT networks.

SUMMARY OF THE INVENTION

Some embodiments of the invention are based on recognition that the consumer wireless devices are evolving from the current generation to the next generation, wherein the current generation devices support single communication mode/interface and/or perform one simple function, wherein the next generation devices can support multiple communication modes/interfaces and/or perform more functions, wherein the devices supporting single communication mode are referred as to the single-mode and the devices supporting multiple communication modes/interfaces are referred as to multi-mode.

Some embodiments of the invention are based on recognition that during the consumer device migration phase, it is impractical to completely replace the deployed current generation devices with the next generation devices due to cost consideration and service continuation.

To that end, one object of various embodiments of the invention is to form the next generation wireless IoT networks using data concentrators, the mixed current generation nodes and next generation nodes, wherein the data concentrators are considered as multi-mode nodes, the current generation nodes are single-mode regular data nodes and the next generation nodes are classified into multi-mode regular data nodes, single-mode priority data nodes and multi-mode priority data nodes, wherein the current generation nodes and next generation multi-mode regular data nodes collect regular data only, next generation single-mode priority data nodes and next generation multi-mode priority data nodes collect both regular data and priority data, wherein the nodes that collect regular data only are referred to as D-Nodes and the nodes that collect both regular data and priority data are referred as to P-Nodes.

Some embodiments of the invention are based on recognition that the route discovery is inevitable in a multi-hop wireless network, in which at least one data node cannot directly communicate with the data concentrator and the communication needs to be relayed by other data nodes.

Accordingly, various embodiments of the invention form two routing topologies for next generation IoT networks, a regular topology is used to deliver regular data and a priority topology is used to deliver priority data, wherein the regular routes in regular topology, referred as to D-Routes, are discovered for all data nodes by using distance based approach, wherein the priority routes in priority topology, referred as to P-Routes, are discovered only for priority nodes to minimize route overlap, route transmission and route length, wherein the D-Routes are less efficient, wherein the P-Routes are more efficient.

Some embodiments of the invention are based on recognition that the nodes in the next generation IoT networks can be single-mode nodes or multi-mode nodes, wherein the single-mode nodes support low rate communication mode and the multi-mode nodes support both low rate communication mode and high rate communication mode, wherein to support interoperability, the low rate communication mode of multi-mode nodes must be same as the low rate communication mode of single-mode nodes.

Accordingly, various embodiments of the invention form low rate links and high rate links in routing topologies, wherein a low rate link is formed between two single-mode nodes or between a single-mode node and a multi-mode node and a high rate link is formed between two multi-mode nodes only.

Some embodiments of the invention are based on recognition that the priority nodes in the next generation IoT networks can collect both regular data and priority data, wherein the priority data has higher priority than regular data and the delivery of the priority data has higher priority than the delivery of regular data delivery.

Accordingly, various embodiments of the invention provide priority based data routing such that if a data node has both regular data and priority data to send or relay, the node transmits the priority data first. Therefore, one object of various embodiments of the invention is to provide the distributed D-Route discovery methods and the centralized P-Route discovery methods.

To that end, the D-Route discovery considers the presence of the multi-mode nodes in the next generation IoT networks, wherein the nodes are organized as Destination Oriented Directed Acyclic Graph (DODAG) in D-Route topology, wherein the communication mode (CM) is included into the DODAG Information Object (DIO) message with CM=1 indicating the single-mode node and CM=2 indicating the multi-mode node, wherein the CM is used to compute a multi-mode link count (MLC) metric to represent the number of multi-mode links along a route, wherein a route with smaller MLC consists of less multi-mode links and a route with larger MLC consists of more multi-mode links, wherein a data node selects a route with larger MLC if other conditions are same. Additionally, the accumulate traffic load (ATL) is included into the Destination Advertisement Object (DAO) messages, wherein ATL parameter can be used to compute route communication time (RCT) metric, wherein a data node selects a route with smaller RCT if other conditions are same.

Some embodiments of the invention are based on recognition that route overlap can delay data delivery and cause data loss. P-Route discovery depends on the number of nodes in the network, the number of priority nodes and node deployment. It is not always possible to discover zero overlap P-Routes. However, P-Route overlap can be minimized.

To that end, the optimal P-Routes are discovered to minimize the objectives such as route overlap, route transmission time and route length. Accordingly, how to compute the degree of route overlap becomes inevitable. However, the existing the route overlap computation is defined for point-to-point (P2P) routing that is not suitable for multi-point-to-point (MP2P) routing, where all routes have same destination node, which does not transmit any data and therefore, should not be counted in route overlap computation.

It is one object of some embodiments to define route overlap of MP2P routes as the sum of individual forward node overlaps by the routes, wherein the forward nodes are the nodes on the routes that send or relay data. Mathematically, route overlap is total number of times the routes repeatedly pass through the forward nodes.

Some embodiments of the invention are based on recognition that the cyclic routes are not efficient because they have longer delay, waste communication bandwidth and node resources, and can interfere with other routes. Therefore, the P-Routes must be discovered without cycle.

Accordingly, some embodiments of the invention provide a recursive acyclic route discovery method to discover acyclic routes from priority nodes to data concentrator in a next generation IoT network, wherein the recursive acyclic route discovery starts from a priority node and extends route hop-by-hop until the route reaches the data concentrator or the route cannot be extended without cycle.

Some embodiments of the invention are based on recognition that the maximum number of non-overlap routes can be discovered equals to the number of physical neighbors of the data concentrator.

To that end, it is object of some embodiments to discover P-Routes for priority nodes to minimize route overlap, wherein the P-Route discovery is formulated as a non-linear optimization problem.

According to some embodiments of the present invention, a node device is provide to be used in a multi-hop hetero-geneous wireless network including single-mode nodes and multi-mode nodes. The node device may include a trans-ceiver configured to transmit and receive messages to dis-cover regular data routes (D-Routes), wherein the discov-ered D-Routes form a destination oriented directed acyclic graph (DODAG) topology, wherein the transceiver is con-figured to receive and transmit regular data in the destination oriented directed acyclic graph (DODAG) topology and priority data in an optimal routing topology; a memory configured to store computer executable programs and DODAG topology configuration parameters including a rank specified by Internet Protocol version 6 (IPv6) Routing Protocol for Low-Power and Lossy Networks (RPL) proto-col and a communication mode (CM) and a multi-rate link count (MLC); and a processor configured to perform steps of the computer executable programs, wherein the steps com-prise: discovering the D-Routes for all data nodes to form the DODAG topology by using the IPv6 Routing Protocol for Low-Power and Lossy Networks (RPL) protocol, wherein the RPL protocol uses a DODAG information object (DIO) message for an upward route discovery process and a destination advertisement object (DAO) message for a downward route discovery process; discovering neighbor nodes while the discovering the D-Routes, wherein the processor determines another node as a neighbor node if the processor receives a broadcasted DIO message from the other node via the transceiver; and sending accumulated traffic load (ATL) and identifiers of the neighbor nodes to a data concentrator via the DAO massage by using the trans-ceiver.

Further, some embodiments of the present invention pro-vide a node device used in a multi-hop heterogeneous wireless network including a multi-mode concentrator. The node device may include a transceiver configured to transmit a destination oriented directed acyclic graph (DODAG) information object (DIO) message to initiate a regular data route (D-Route) discovery and receive a destination adver-tisement object (DAO) message to configure downward regular data routes (D-Routes) and obtain an accumulated traffic load (ATL) and neighbor information of data nodes to perform an optimal priority route (P-Route) discovery to build an optimal routing topology, wherein the transceiver is configured to transmit the optimal routing topology to the data nodes on discovered priority routes (P-Routes) to deliver priority data to the multi-mode concentrator, wherein the transceiver is configured to receive regular data in the DODAG topology and the priority data in the optimal routing topology; a memory configured to store computer executable programs and parameters including a communi-cation mode (CM), the ATL, a neighbor set, a degree of route overlap (DRO), an optimal priority route (P-Route) discov-ery; and a processor configured to perform steps of the computer executable programs, wherein the steps comprise: discovering the D-Routes for all data nodes by using an Internet Protocol version 6 (IPv6) Routing Protocol for Low-Power and Lossy Networks (RPL) protocol, wherein the RPL protocol uses the DIO message for an upward route discovery process and a destination advertisement object (DAO) message for a downward route discovery process; and discovering optimal priority routes (P-Routes) by for-mulating a P-Route discovery problem as a non-linear optimization problem to minimize route overlap computed using the DRO, wherein the discovered optimal P-Routes are further optimized to minimize route transmission time and route length.

Some embodiments are based on recognition that the problem of the minimal overlap route discovery can be a multi-solution problem, where multiple sets of P-Routes can minimize route overlap.

To that end, some embodiments of invention provide a method to find a set of the minimal overlap P-Routes to minimize the total route transmission time.

Additionally, some embodiments of invention also pro-vide a method to find a set of the minimal overlap P-Routes to minimize the total route length.

BRIEF DESCRIPTION OF THE DRAWINGS

The presently disclosed embodiments will be further explained with reference to the attached drawings. The drawings shown are not necessarily to scale, with emphasis instead generally being placed upon illustrating the prin-ciples of the presently disclosed embodiments.

FIG. 8A shows algorithm to setup acyclic route discovery for a priority node in a next generation wireless IoT network;

FIG. 8B shows algorithm to recursively extend and expand acyclic sub-route for a priority node in a next generation wireless IoT network;

FIG. 9 is an algorithm to discover the minimal overlap routes for all priority nodes in a next generation wireless IoT network.

Figure 1:
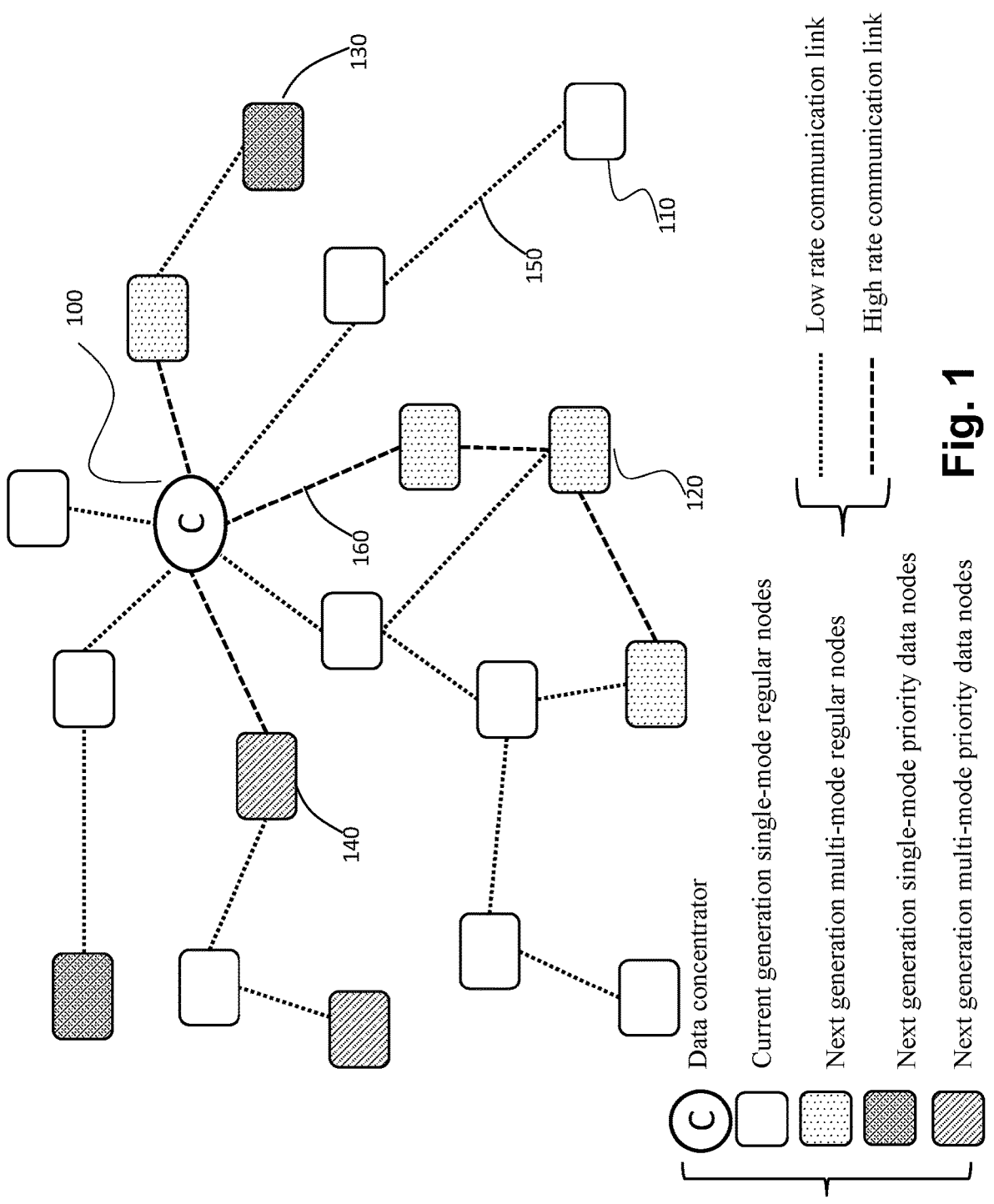
FIG. 1 is a schematic illustrating a next generation wire-less IoT network consisting of a data concentrator and the mixed current generation nodes and next generation nodes.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

In a current generation IoT network, the devices are typically installed with less resources and perform simple functions, e.g., battery powered and supporting IEEE 802.15.4 communication protocol and using the FSK modulation scheme for data transmission. On the other hand, the next generation IoT networks will typically include the mixed current generation devices and next generation devices. The next generation devices are equipped with more resources and can perform more functions, e.g., using grid power, supporting both IEEE 802.15.4 communication protocol and LTE/5G communication protocol and using both FSK and QAM modulation schemes. Accordingly, the next generation devices in next generation IoT networks can play multiple roles. Take upcoming next generation smart meter network for example, which will consist of the current generation meters and the next generation meters. The current generation meters collect metering data only and periodically send metering data to data concentrator. However, the next generation meters can 1) collect both metering data and power supply information or 2) support multiple communication modes/interfaces or 3) collect both types of data and support multiple communication modes/interfaces. The power supply information is delivered in the last gasp message and is critical in smart meter networks for power suppliers to make predictive maintenance and diagnose the cause of the abnormal event such as power outage and therefore, has higher priority than regular metering data. Therefore, the next generation meters that can collect power supply information are also called priority meters. Accordingly, besides the periodic metering data delivery, the priority meters need to efficiently deliver event based last gasp message.

In next generation IoT networks, the nodes can be classified based on different criteria, e.g., (1) data source or data destination role, (2) communication capability and (3) data collection capability. Based on criterion 1), nodes that collect data are called data nodes and nodes that concentrate data are called data concentrator. Based on criterion 2), nodes that support one communication mode are named as single-mode nodes and nodes that support multiple communication modes/interfaces are named as multi-mode nodes, especially, data concentrators are multi-mode nodes. Based on criterion 3), the nodes that collect regular data only are known as regular nodes and the nodes that collect both regular data and priority data are known as priority nodes.

FIG. 1 is a schematic illustrating a next generation wireless IoT network consisting of a data concentrator 100, current generation single-mode regular data nodes 110, next generation multi-mode regular data nodes 120, next generation single-mode priority data nodes 130 and next generation multi-mode priority data nodes 140. The nodes form a multi-hop mesh network, where the general flow of data packets is from the data nodes (current generation nodes or next generation nodes) to data concentrator 100, although control messages can be sent in either direction. At least one data node cannot directly communicate with data concentrator 100 and therefore, the communication needs to be relayed by intermediate nodes. A single-mode node can only support low rate communication mode. However, a multi-mode node can support both low rate communication mode and high rate communication mode. As a result, a low rate link 150 is formed by two single-mode nodes or by a single-mode node and a multi-mode node. On the other hand, a high rate link 160 can only be formed by two multi-mode nodes. The single-mode nodes include the current generation regular data nodes 110 and the next generation single-mode priority data nodes 130. The multi-mode nodes include next generation multi-mode regular data nodes 120, next generation multi-mode priority data nodes 140 and data concentrator 100.

Figure 2:
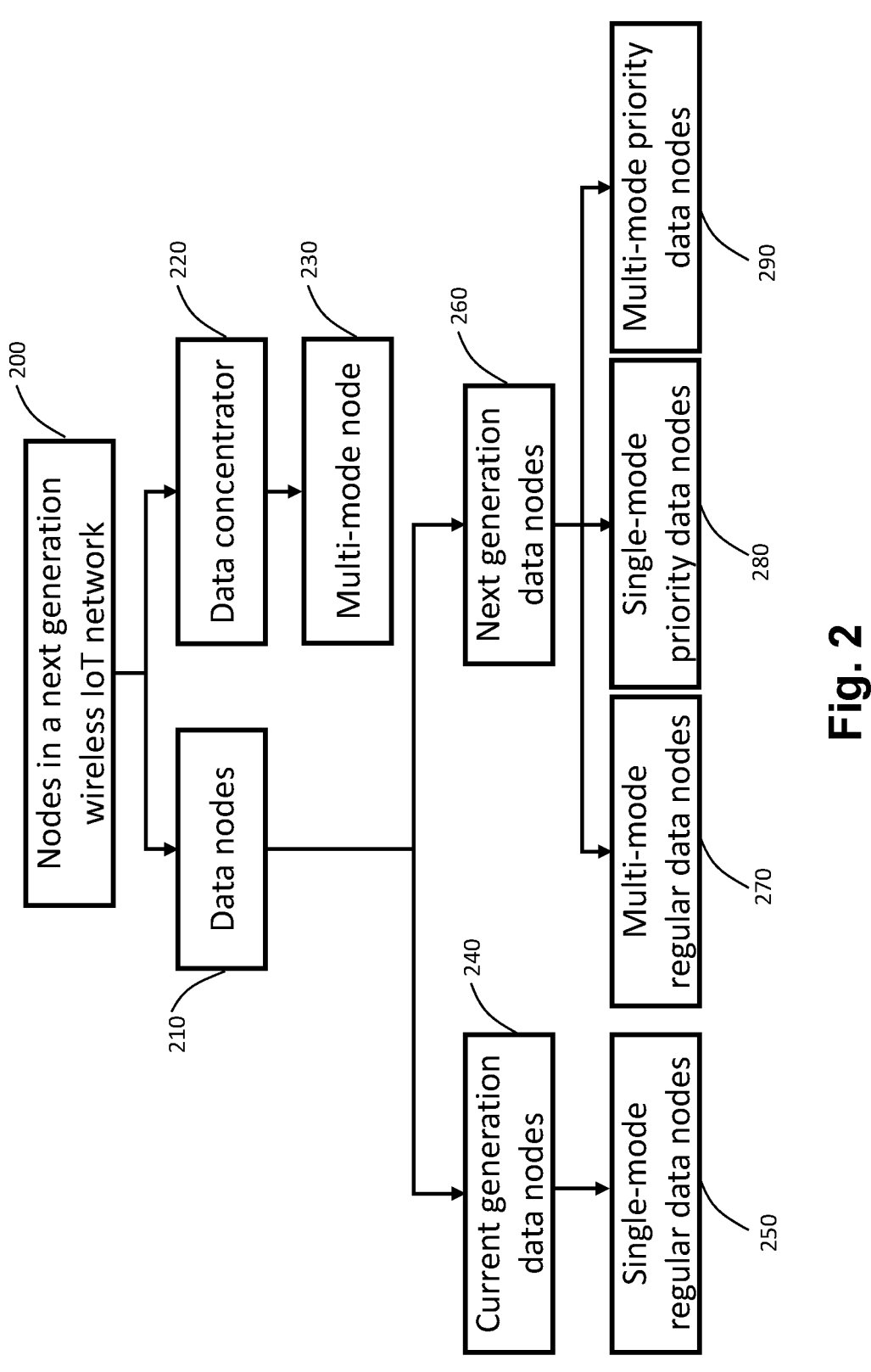
FIG. 2 shows the node classification in a next generation wireless IoT network, wherein the data concentrator is a multi-mode node, the current generation nodes are regular single-mode nodes and the next generation nodes including multi-mode regular nodes, priority single-mode nodes and priority multi-mode nodes.

FIG. 2 shows node classification in the next generation wireless networks, where the nodes in next generation IoT networks 200 are first classified as data nodes 210 and data concentrator 220. The data concentrator 220 is considered as a multi-mode node 230. The data nodes 210 are further classified as current generation data nodes 240 and next generation data nodes 260. The current generation data nodes 240 are classified as single-mode regular data nodes 250, the next generation data nodes 260 are classified into multi-mode regular data nodes 270, single-mode priority data nodes 280 and multi-mode priority data nodes 290.

To deliver data in multi-hop IoT networks, routing is inevitable. The routing has been extensively studied for many years. The concept of routing is simple. However, the routing problem is a high complexity problem consisting of two procedures: route discovery and routing scheduling. The route discovery can be NP-complete, e.g., maximizing throughput in multi-hop wireless network is proved to be NP-hard as a result of the wireless interference. It has been also proved that both centralized and distributed routing schedule problems are NP-complete in 2D Mesh topology, which further enhances the complexity of the routing schedule problems.

There are well known route discovery protocols including Dijkstra's shortest path algorithm, dynamic source routing (DSR), ad-hoc on-demand distance vector (AODV) and the Internet Protocol version 6 (IPv6) Routing Protocol for Low-Power and Lossy Networks (RPL). However, these routing protocols are not designed to handle data heterogeneity and node heterogeneity, e.g., RPL sends all uplink traffic to default parent and use same network configuration parameters for all nodes. Accordingly, it is necessary to address challenges arising in the next generation IoT networks.

For the next generation IoT networks to work efficiently, many issues need to be addressed. Route overlap is one of such issues to be addressed by the next generation IoT networks, especially for priority data delivery. Route overlap can significantly affect network performance. The overlapped routes can delay data delivery and cause data loss in wireless networks. Therefore, to enhance reliability of priority data delivery, the route overlap needs to be minimized, especially for routes that are used to deliver priority data.

The current invention provides a two-topology routing architecture for next generation IoT networks, a regular topology used for regular data delivery and a priority topology used for priority data delivery. The routes in regular topology are called regular data routes (D-Routes) and the routes in priority topology are named as priority routes (P-Routes). The D-Routes are discovered for all data nodes in the network. However, the P-Routes are discovered for priority data nodes only. The D-Routes are discovered using conventional protocol based approach. However, the P-Routes are discovered using the invented optimal approach, which formulates P-Route discovery as an optimization problem. Accordingly, the P-Routes are optimal routes to minimize route overlap, route transmission time and route length.

Figure 3:
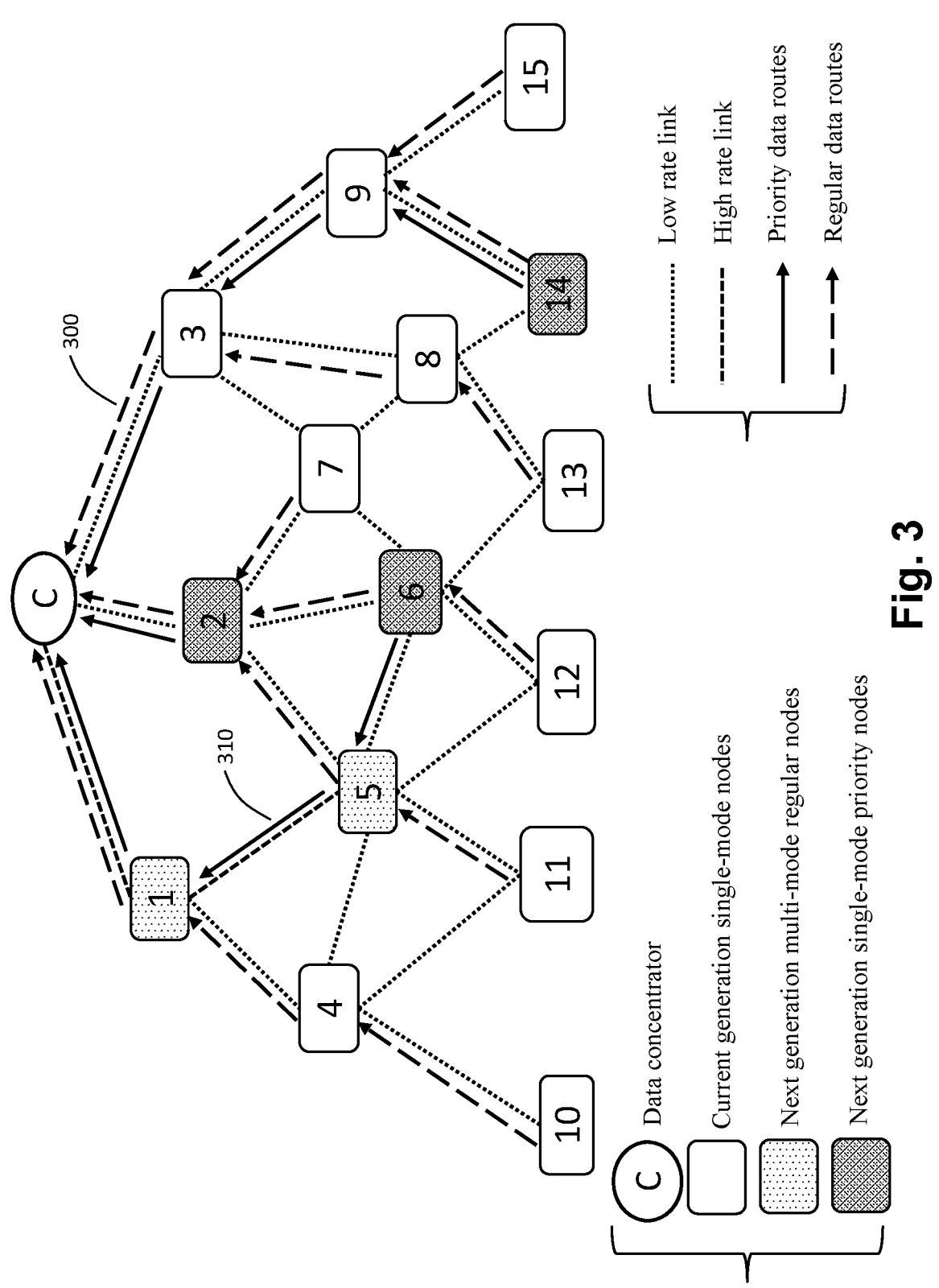
FIG. 3 shows an example of two-topology routing archi-tecture in the next generation wireless IoT network.

FIG. 3 shows an example of the two-topology routing architecture for next generation IoT network consisting a data concentrator C, two next generation multi-mode regular data nodes 1 and 5, three next generation single-mode priority data nodes 2, 6 and 14 and ten current generation single-mode data nodes 3, 4, 7, 8, 9, 10, 11, 12, 13 and 15. The arrowed dash routes 300 represent D-Routes in routing topology for regular data delivered. These distance-based routes are discovered using conventional RPL protocol. The arrowed solid routes 310 represent P-Routes in routing topology for priority data delivery. These routes are discovered using optimal methods provided by the present invention. The routes for priority data nodes 2, 6 and 14 in two topologies are different. In the regular topology, routes $2 \rightarrow C$, $6 \rightarrow 2 \rightarrow C$ and $14 \rightarrow 9 \rightarrow 3 \rightarrow C$ overlap at node 2. However, in the priority topology, routes $2 \rightarrow C$, $6 \rightarrow 5 \rightarrow 1 \rightarrow C$ and $14 \rightarrow 9 \rightarrow 3 \rightarrow C$ do not overlap. In addition, links $5 \rightarrow 1$ and $1 \rightarrow C$ are high rate links. The P-Routes use these high rate links. However, the D-Routes do not take advantages of these high rate links. Assume 100 kbps and 800 kbps are the PHY data rates of low rate communication mode and high rate communication mode, respectively. It takes a low rate link 8 ms to transmit a packet of 100 bytes. However, a high rate link takes only 1 ms. Furthermore, IoT devices are typically half-duplex. Considering wireless link interference and ignoring random backoff delay, the D-Routes take 32 ms to deliver three priority data packets. On the other hand, the P-Routes take only 26 ms. These results indicate that although the P-Routes can be longer, they are more efficient.
Necessity of Multi-Topology Routing With the advent of 5G and beyond communication technologies, the consumer IoT devices are evolving from current generation to next generation. The current generation devices installed with less resources and perform simple function, e.g., support one communication mode (named as single-mode device) and collect regular data. On the other hand, the next generation devices are equipped with more resources and can perform more functions, e.g., support multiple communication modes/interfaces (named as multi-mode device) and/or collect both regular data and priority data (named as priority device). However, during the migration phase, it is impractical to completely remove the deployed current generation devices. Take next generation smart meter network for example, which will consist of current generation regular meters and next generation priority meters. The regular meters periodically collect and deliver metering data. However, the priority meters not only collect regular metering data but also sense power supply information, which is critical for power suppliers to make predictive maintenance and diagnose the cause of the abnormal events such as power outage and therefore, has higher priority than regular metering data. Accordingly, besides the regular metering data, the priority meters also need to efficiently deliver power supply information. Therefore, new routing architecture is needed to delivery heterogeneous data in next generation IoT networks. To that end, how to efficiently route diverse data in next generation IoT networks needs to be addressed.

Even though routing has been extensively studied for current generation IoT networks, the routing for next generation IoT networks has not been well studied. The present invention provides a two-topology routing architecture for next generation IoT networks, a regular topology used for regular data delivery and a priority topology used for priority data delivery. The routes in regular topology are named as D-Routes and the routes in priority topology are named as P-Routes. The data nodes that only collect regular data are known as D-Nodes and data nodes that collect both regular data and priority data are known as P-Nodes. The D-Routes are discovered for all data nodes in the network. However, the P-Routes are discovered for priority data nodes only. The D-routes are discovered using a distance based approach. However, the P-Routes are discovered using an optimal approach, which formulates route discovery as an optimization problem. Accordingly, the P-Routes are optimal routes to minimize route overlap, route transmission time and route length.

The embodiments of invention consider a next generation IoT network consisting of a data concentrator, a set of N regular data nodes named as D-Nodes and a set of M priority data nodes named as P-Nodes, where both D-Nodes and P-Nodes can be single-mode or multi-mode. The data concentrator is considered as a multi-mode node. The communications among single-mode nodes and between single-mode nodes and multi-mode nodes use low rate mode. The high rate mode can be only applied among multi-mode nodes. The deployment of D-Nodes and P-Nodes are random.
Distributed D-Route Discovery The embodiments of invention enhance RPL routing protocol for D-Route discovery. RPL uses the DODAG Information Object (DIO) message for upward route discovery and the Destination Advertisement Object (DAO) message for downward route construction. To fulfil P-Route discovery, each data node also performs neighbor discovery during D-Route discovery. A node considers another node as a neighbor if it receives the broadcasted DIO message from that node. Once D-Route discovery completes, each data node sends its neighbor information to data concentrator via a DAO message.

Carrying Communication Mode and Multi-Mode Link Count in DIO Message: The DIO message carries information that allows a node to obtain DODAG configuration parameters for parent selection, i.e., route selection. In this invention, the communication mode (CM) and the multi-mode link count (MLC) are also included in DIO message with CM=1 indicating single-mode and CM=2 indicating multi-mode. Using the CM parameter, the MLC metric can be computed to represent the number of multi-mode links along a route, i.e., the number of high rate links alone a route. At the data concentrator, CM is set to 2 and MLC is set to 0. During D-Route discovery process, a data node increases MLC by 1 if and only if it is a multi-mode node and the DIO message transmitter is also a multi-mode node. Data nodes use RPL rank metric and MLC metric to select parents. If the ranks of candidate parents are same, a data node selects a route with the larger MLC since it consists of more high rate links. The rank is a distance based metric that represents a node's position with respect to the concentrator within a DODAG topology. The lower value of rank means the node is close to the concentrator, and the larger value of the rank indicates the node is away from the concentrator.

Carrying Accumulated Traffic Load, neighbor information and communication mode in DAO Message: Traffic load can significantly impact network performance. However, it has been not well addressed in RPL routing protocol. In this invention, each data node includes its accumulated traffic load information into DAO message. In RPL protocol, a data node not only sends its own data but also relays its children's data to default parent. Therefore, the accumulated traffic load (ATL) at a data node n can be expressed as $$ATL(n) = LD(n) + \sum_{k=1}^{n_c} ATL(c_k^n), \qquad (1)$$

where LD(n) is traffic load of node n, $n_c$ is the number of children of node n and $$c_k^n \ (k = 1, 2, \ldots, n_c)$$

are the children. The ATL information is used in P-Route discovery. In addition, during D-Route discovery process, a data node can find its neighbors via the received DIO messages, which is transmitted by all nodes in the network according to RPL protocol. A data node considers another node as a neighbor if the node receives the DIO message from that node. The neighbor information is a set containing identifiers of neighbors of a data node. Furthermore, a data node also includes its communication mode (CM) into DAO message.

Centralized P-Route Discovery

Once neighbor information is available, the data concentrator C can discover optimal P-Routes for the P-Nodes. Denote as $\mathbb{P} \overset{\text{def}}{=} \{p_1, p_2, \ldots, p_M\}$ set of P-Nodes in the network and denote the P-Route route $$f_0^i = p_i \rightarrow f_1^i \rightarrow f_2^i \rightarrow \ldots \rightarrow f_{h_i}^i \rightarrow C$$

from P-Node $p_i$ to data concentrator C as $R_{p_i} \overset{\text{def}}{=}$ $$\left( f_0^i = p_i, f_1^i, f_2^i, \ldots, f_{h_i}^i, C \right)$$

(i=1, 2, . . . , M), then the set $\mathbb{F}_{p_i} \overset{\text{def}}{=}$ $$\left\{ f_0^i = p_i, f_1^i, f_2^i, \ldots, f_{h_i}^i \right\}$$

consists of nodes on the route $R_{p_i}$ that transmit or forward data in priority data delivery process and therefore, is named as forward set of route $R_{p_i}$ and nodes in $\mathbb{F}_{p_i}$ are referred to as forward nodes.

MP2P Route Overlap Definition and Calculation

There are different definitions for route overlap. One pre-art defines the link (edge) overlap as route overlap. However, this definition may undercount route overlap, e.g., in FIG. 3, routes (11,5,1, C) and (12,5,2, C) overlap at node 5, but there is no link overlap on these two routes. Another pre-art defines route overlap as the sum of all individual node overlaps between any pair of the routes. This node based overlap definition for P2P routing may overcount the overlap of MP2P routes, e.g., aforementioned two routes have only one effective node overlap at node 5 since data concentrator C does not transmit data, yet this definition gives two overlaps, one at node 5 and another one at node C.

The embodiments of invention introduce a route overlap definition for MP2P routes, where data concentrator C is excluded in route overlap computation. The degree of route overlap (DRO) for routes $R_{p_1}, R_{p_2}, \ldots, R_{p_M}$ is defined as the sum of individual forward node overlaps by routes $R_{p_1}, R_{p_2}, \ldots, R_{p_M}$, i.e., total number of times routes $R_{p_1}, R_{p_2}, \ldots, R_{p_M}$ repeatedly pass through the forward nodes, e.g., aforementioned forward node 5 repeats once. To mathematically calculate the DRO, let denote as Len(•) the length of a route and $N_D (R_{p_1}, R_{p_2}, \ldots, R_{p_M})$ the total number of the distinct forward nodes on the routes $R_{p_1}, R_{p_2}, \ldots, R_{p_M}$. The DRO of the routes $R_{p_1}, R_{p_2}, \ldots, R_{p_M}$ can be calculated as a.

$$DRO(R_{p_1}, R_{p_2}, \ldots, R_{p_M}) = \sum_{i=1}^{M} Len(R_{p_i}) - N_D(R_{p_1}, R_{p_2}, \ldots, R_{p_M}). \qquad (2)$$

Acyclic Route Discovery

Figure 4:
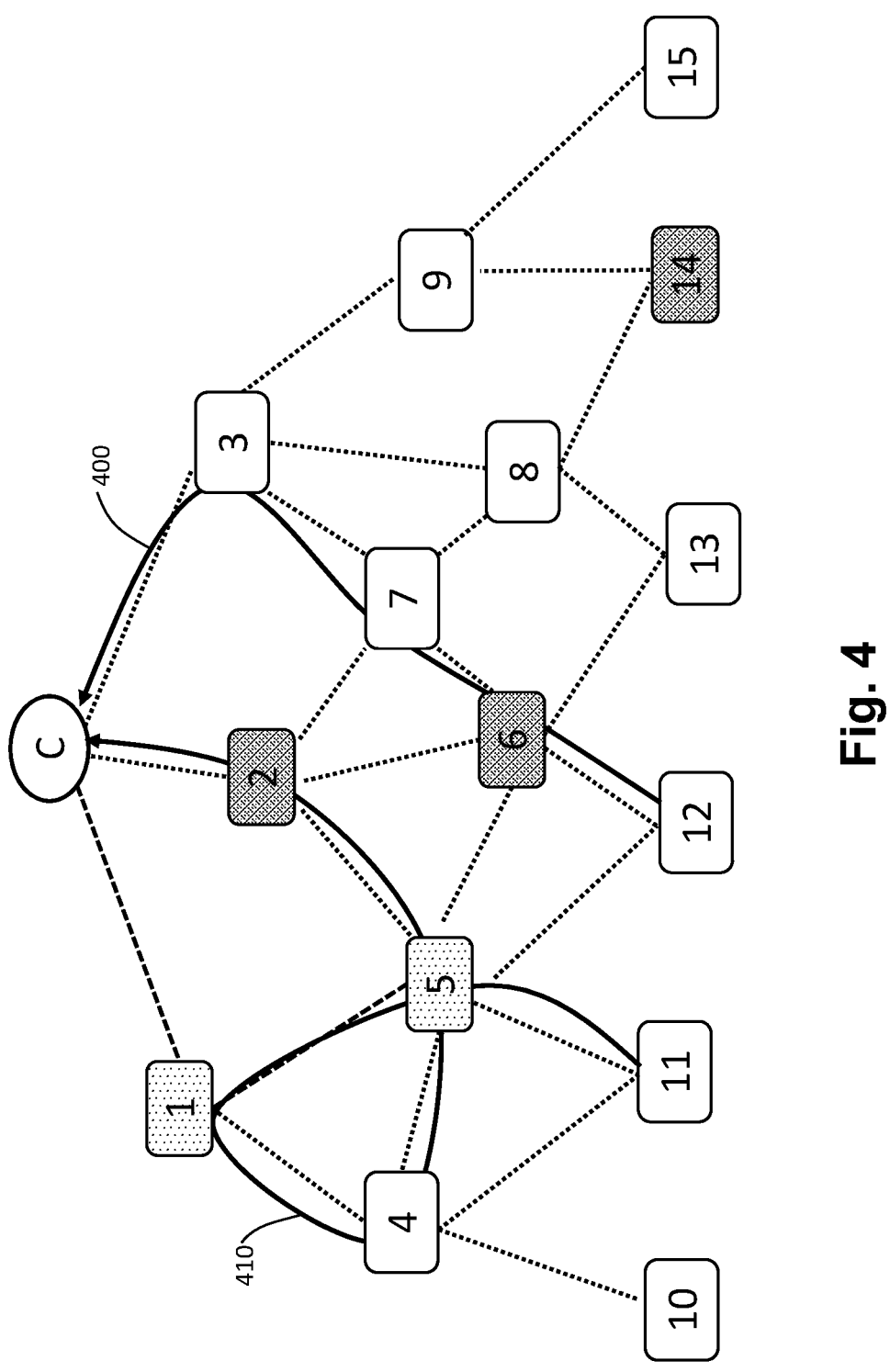
FIG. 4 illustrates examples of cyclic route and acyclic route in a next generation wireless IoT network.

Cyclic routes are not efficient. FIG. 4 shows examples of acyclic route and cyclic route, in which route (12, 6, 7, 3, C) 400 is an acyclic route and route (11, 5, 1, 4, 5, 2, C) 410 is a cyclic route since 5→1→4→5 is a cycle.

A MP2P route $$R_{p_i} = \left( f_0^i = p_i, f_1^i, f_2^i, \ldots, f_{h_i}^i, C \right)$$

is acyclic if and only if it satisfies following conditions:
a. 1.

$$f_j^i \neq f_k^i \ \forall \ j \neq k,$$

b. 2.

$$f_j^i \neq C \ \text{for} \ j = 0, 1, \ldots, h_i,$$

c. 3.

$$f_{j+1}^i$$

is a neighbor of $$f_j^i$$

for j=0, 1, . . . , $h_i$−1, d. 4. Concentrator C is a neighbor of $$f_{h_i}^i,$$

and e. 5. Only $$f_{h_i}^i$$

is a neighbor of concentrator C.

Let denote as $\mathbb{R}_{p_i}$ the set of all acyclic routes for P-Node $p_i$. The data nodes that can directly communicate with concentrator C, i.e., the physical neighbors of node C, are called as direct link nodes and other data nodes are named as non-direct link nodes. Noticed that direct link node may be different from 1-hop node because link reflects physical connectivity and hop represents logic connectivity. A 1-hop node is a direct link node but a direct link node may be not a 1-hop node. Denote as $\mathbb{N}_n$ the neighbor set of node n. For a direct link node $p_d \in \mathbb{N}_C$, only one acyclic route is constructed, i.e., $\mathbb{R}_{p_d} = \{(p_d, C)\}$. For a non-direct link node $p_n$, this incention provides a recursive method to discover acyclic routes. The recursive method extends and expands an acyclic sub-route hop-by-hop starting from source node $p_n$ until route reaches data concentrator C.

Figure 5:
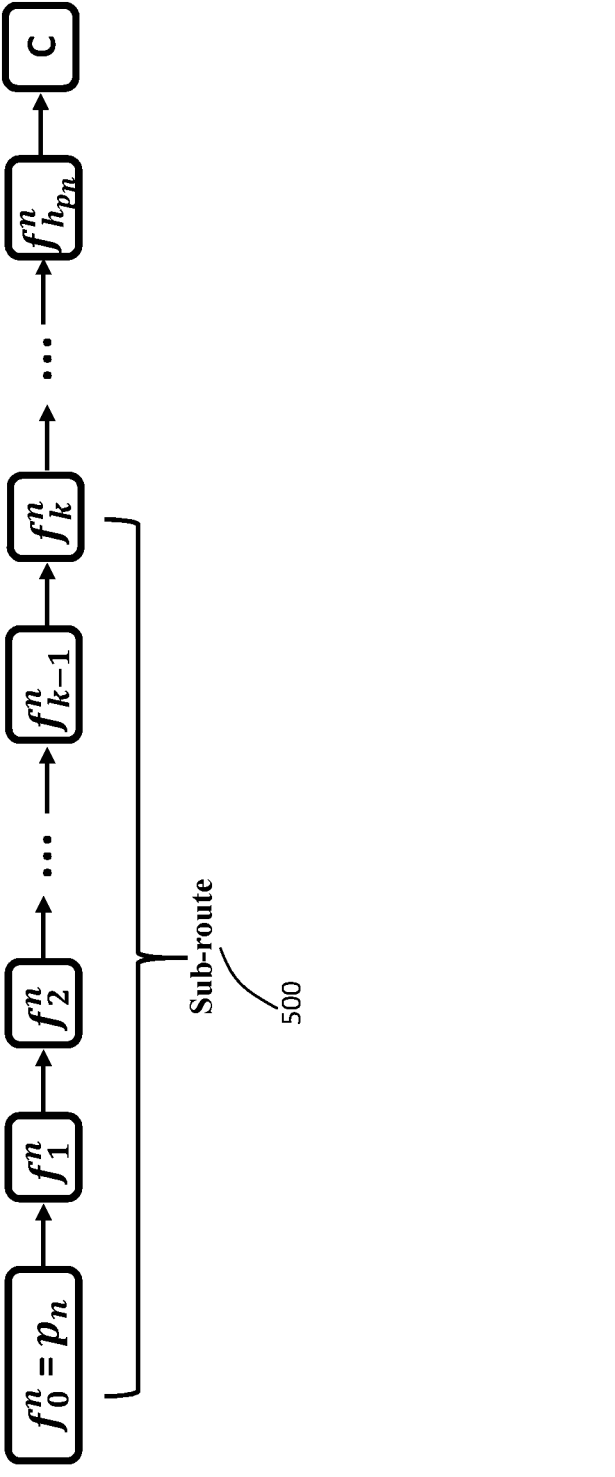
FIG. 5 depicts an example of sub-route on a route from a priority node p to data concentrator C within a multi-point-to-point (MP2P) routing topology in the next generation wireless IoT networks.

FIG. 5 depicts an example of sub-route 500 on a P-Route from a priority node $p_n$ to data concentrator C within a multi-point-to-point (MP2P) routing topology in the next generation wireless IoT networks.

Before introducing recursive acyclic route discovery algorithm, the definition of the end node is first defined.

Definition: An end node is a data node from which the extension of an acyclic sub-route ends, i.e., the sub-route cannot be extended without cycle.

Figure 6:
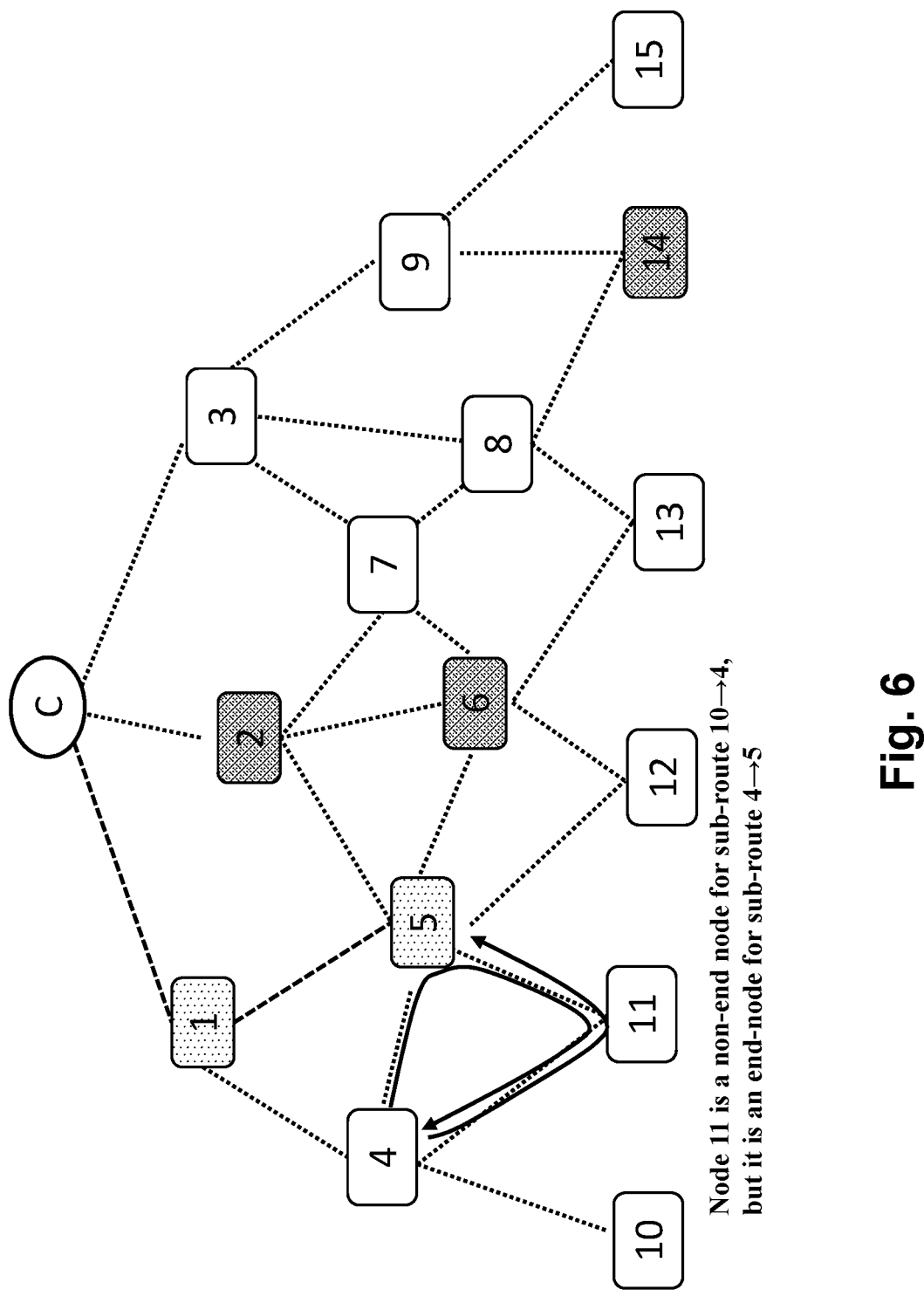
FIG. 6 shows examples of end node and non-end node in acyclic P-Route discovery in a next generation wireless IoT network.

End node is different from leaf node. An end node is a leaf node, but a leaf node is not necessarily an end node. The end node decision depends on the sub-route to be extended. A node can be an end node for one sub-route extension, but it may be not an end node for another sub-route extension. In FIG. 6, to extend sub-route (10,4), node 11 is not an end node, but to extend sub-route (4,5), node 11 is an end node.

Mathematically, to extend a sub-route $$R_{p_n}^s = (f_0^n = p_n, f_1^n, f_2^n, \ldots, f_k^n),$$

node $$f_k^n$$

is an end node if and only if $$\mathbb{N}_{f_k^n} \backslash \mathbb{F}_{p_n}^s = \emptyset,$$

where $$\mathbb{F}_{p_n}^s$$

$$\overset{\text{def}}{=}$$

$$\{f_0^n = p_n, f_1^n, f_2^n, \ldots, f_k^n\}.$$

Accordingly, at the hop k, the extension of the sub-route $$R_{p_n}^s$$

(1) completes if $$f_k^n$$

is a direct link node or (2) ends if $$f_k^n$$

is an end node or (3) continues otherwise. The set $$\mathbb{N}_{f_k^n} \backslash \mathbb{F}_{p_n}^s$$

is named as extendable set of node $$f_k^n$$

for the sub-route $$R_{p_n}^s.$$

If the set $$\mathbb{N}_{f_k^n} \backslash \mathbb{F}_{p_n}^s$$

contains more than nodes, the sub-route $$R_{p_n}^s$$

is expanded at node $$f_k^n.$$

FIGS. 8A and 8B describe acyclic route discovery algorithms, in which acyclic route discovery initialization is provided in algorithm 1 and the recursive acyclic sub-route extension is provided in algorithm 2. For a non-direct link node $p_n$, let $\mathbb{N}_{p_n} = \{n_1, n_2, \ldots, n_h\}$, then algorithm 1 sets up h 1-hop sub-routes. The algorithm 1 then calls algorithm 2 to recursive extend and expand each sub-route. For example, to extend the sub-route 700 of a non-direct link node $p_n$ at k-hop, let $$\mathbb{N}_{f_k^n} \backslash \mathbb{F}_{p_n}^s = \left\{ n_1^k, n_2^k, \ldots, n_m^k \right\},$$

Figure 7:
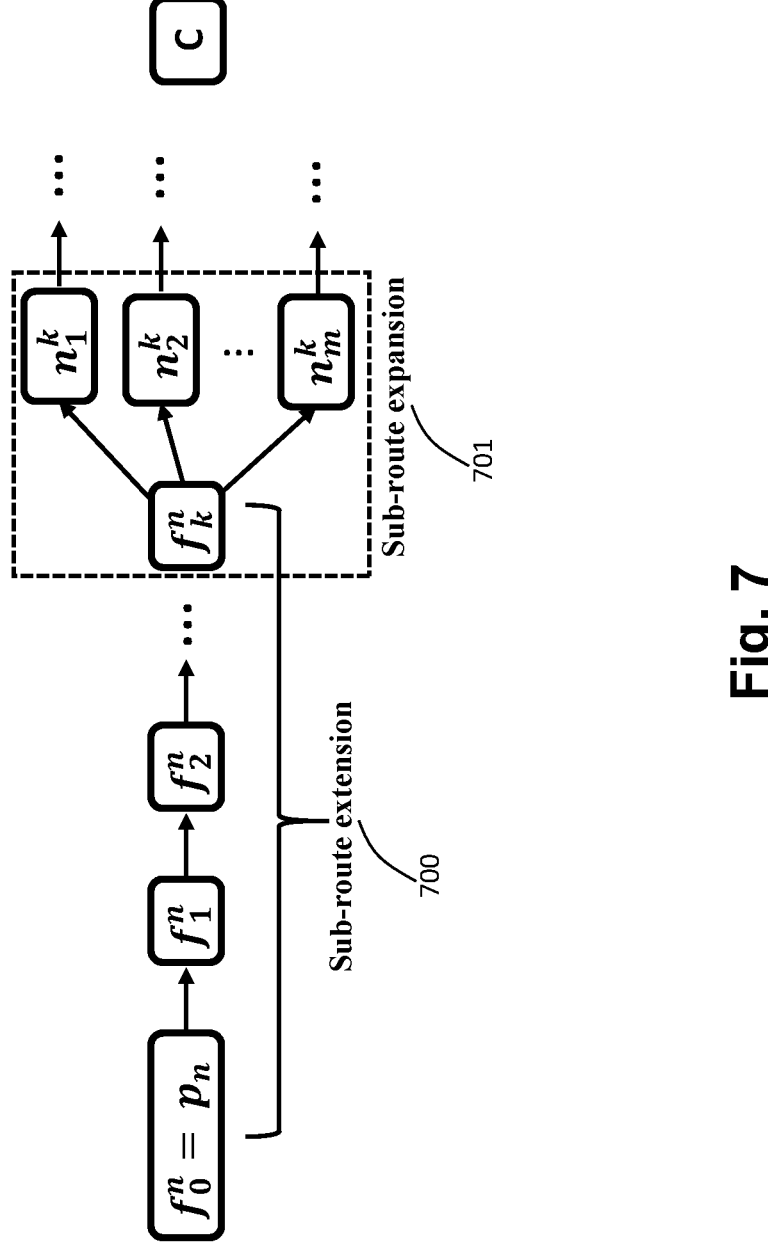
FIG. 7 demonstrates sub-route extension and expansion for a priority node in acyclic P-Route discovery in a next generation wireless IoT network.

FIG. 7 shows that there are m ways 701 to extend acyclic sub-route 700, i.e., sub-route 700 is expanded into m sub-routes. Therefore, during recursive sub-route extension process in algorithm 2, a sub-route can be expanded at each hop so that a sub-route can be extended and expanded into multiple sub-routes at each hop.

The output of algorithms 1 and 2 is acyclic route set $\mathbb{R}_{p_q}$ of P-Node $p_n$. The introduction of route length threshold $L_{max}$ in algorithm 2 is based on the rationale that although minimal overlap routes are desired, the very long routes are not preferred. To remove route length constraint, $L_{max}$ can be set to infinite.

Minimal Overlap P-Route Discovery

It is not always possible to discover zero-overlap P-Routes, e.g., for more than 3 P-Nodes in FIG. 3. The objective is to minimize the route overlap. Once acyclic routes for P-Nodes are discovered, the next step is to find the acyclic routes that minimizes the DRO. This problem can be formulated as an optimization problem, i.e., find routes $$R_{p_1}^o \in \mathbb{R}_{p_1},$$

$$R_{p_2}^o \in \mathbb{R}_{p_2},$$

$$\ldots,$$

$$R_{p_M}^o \in \mathbb{R}_{p_M}$$

for P-Nodes $p_1, p_2, \ldots, p_M$, respectively, such that $$DRO\left(R_{p_1}^o, R_{p_2}^o, \ldots, R_{p_M}^o\right) = \tag{3}$$
$$\min_{R_{p_1} \in \mathbb{R}_{p_1}, R_{p_2} \in \mathbb{R}_{p_2}, \ldots, R_{p_M} \in \mathbb{R}_{p_M}} DRO\left(R_{p_1}, R_{p_2}, \ldots, R_{p_M}\right).$$

It can be seen that the $$DRO\left(R_{p_1}^o, R_{p_2}^o, \ldots, R_{p_M}^o\right) = 0$$

provides an ideal solution, i.e., all routes do not overlap.

The Problem (3) is a non-linear optimization problem that can be intractable to solve, especially for large and dense networks with large number of acyclic routes. In fact, the Problem (3) belongs to combinatorial optimization problem and is weakly NP-Hard.

To solve the Problem (3), this invention provides a greedy heuristic method, which is described as Algorithm 3 in FIG. 9, where $\mathbb{I}_{min}^{ove}$ denotes set of the minimal overlap route IDs. The route length threshold $L_{max}$ impacts complexity of the algorithm 3.

The Problem (3) can be a multi-solution problem, e.g., in FIG. 3, routes (2,C), (6,5,1C), (14,9,3,C) and routes (2,C), (6,5,4,1,C), (14,8,3,C) are two sets of the routes with zero overlap. Therefore, the minimal overlap routes can be further optimized based on other metrics such as route transmission time and route length. It is necessary to point out that in networks without multi-mode node, the minimal length routes may give the minimal transmission time. However, in the presence of multi-mode node, these two objectives may produce different solutions.

Minimal Transmission Time P-Route Discovery

The route transmission time (RTT) is a metric to compute data transmission time along a route. For a route $R_p = (f_0 = p, f_1, \ldots, f_h, C)$, assume $r_0, r_1, \ldots, r_h$ are the highest link transmission rates for links $[f_0 = p \rightarrow f_1]$, $[f_1 \rightarrow f_2]$, $\ldots$, $[f_h \rightarrow C]$, respectively. Then RTT of route $R_p$ is computed as $$RTT(R_p) = \sum_{i=0}^{h} \frac{ETX(f_i) * ATL(f_i)}{r_i}, \tag{4}$$

where $ETX(f_i)$ is the expected transmission count at node $f_i$ (i=0, 1, 2, $\ldots$, h). For a set of minimal overlap routes identified by $$\{I_1, I_2, \ldots, I_M\} \in \mathbb{I}_{min}^{ove},$$

total RTT is given by $$RTT\left(R_{p_1}^{I_1}, R_{p_2}^{I_2}, \ldots, R_{p_M}^{I_M}\right) = \sum_{k=1}^{M} RTT\left(R_{p_k}^{I_k}\right). \tag{5}$$

The objective of minimal transmission time P-Route discovery is to find a set of the minimal overlap routes $$R_{p_1}^{ot}, R_{p_2}^{ot}, \ldots, R_{p_M}^{ot}$$

for P-Nodes $p_1, p_2, \ldots, p_M$, respectively, that minimize the total RTT:

$$RTT\left(R_{p_1}^{ot}, R_{p_2}^{ot}, \ldots, R_{p_M}^{ot}\right) = \min_{\{I_1, I_2, \ldots, I_M\} \in \mathbb{I}_{min}^{ove}} RTT\left(R_{p_1}^{I_1}, R_{p_2}^{I_2}, \ldots, R_{p_M}^{I_M}\right). \tag{6}$$

Minimal Length P-Route Discovery

For a set of minimal overlap routes identified by $$\{I_1, I_2, \ldots, I_M\} \in \mathbb{I}_{min}^{ove},$$

total route length is expressed as $$Len\left(R_{p_1}^{I_1}, R_{p_2}^{I_2}, \ldots, R_{p_M}^{I_M}\right) = \sum_{k=1}^{M} Len\left(R_{p_k}^{I_k}\right). \tag{7}$$

The objective of minimal length P-Route discovery is to find routes $$R_{p_1}^{oh}, R_{p_2}^{oh}, \ldots, R_{p_K}^{oh}$$

for P-Nodes $p_1, p_2, \ldots, p_M$, respectively, that minimize total route length:

$$Len\left(R_{p_1}^{oh}, R_{p_2}^{oh}, \ldots, R_{p_M}^{oh}\right) = \min_{\{I_1, I_2, \ldots, I_M\} \in \|_{min}^{ove}} Len\left(R_{p_1}^{I_1}, R_{p_2}^{I_2}, \ldots, R_{p_M}^{I_M}\right). \tag{8}$$

Delivering P-Routes to Data Nodes by Data Concentrator

After concentrator C discovers the priority routes for priority data delivery, the concentrator C delivers priority routes not only to priority nodes but also regular nodes. In this way, priority nodes know P-Routes to transmit priority data and all nodes in the network know P-Routes to relay priority data.

It is possible that a data node may have both regular data and priority data to transmit or relay at a time. In this case, the data node should transmit or relay priority data first by using priority route. This indicates that a priority route has higher priority than a regular route.

Data Concentrator Allocates Time for Priority Data Delivery

Figure 10:
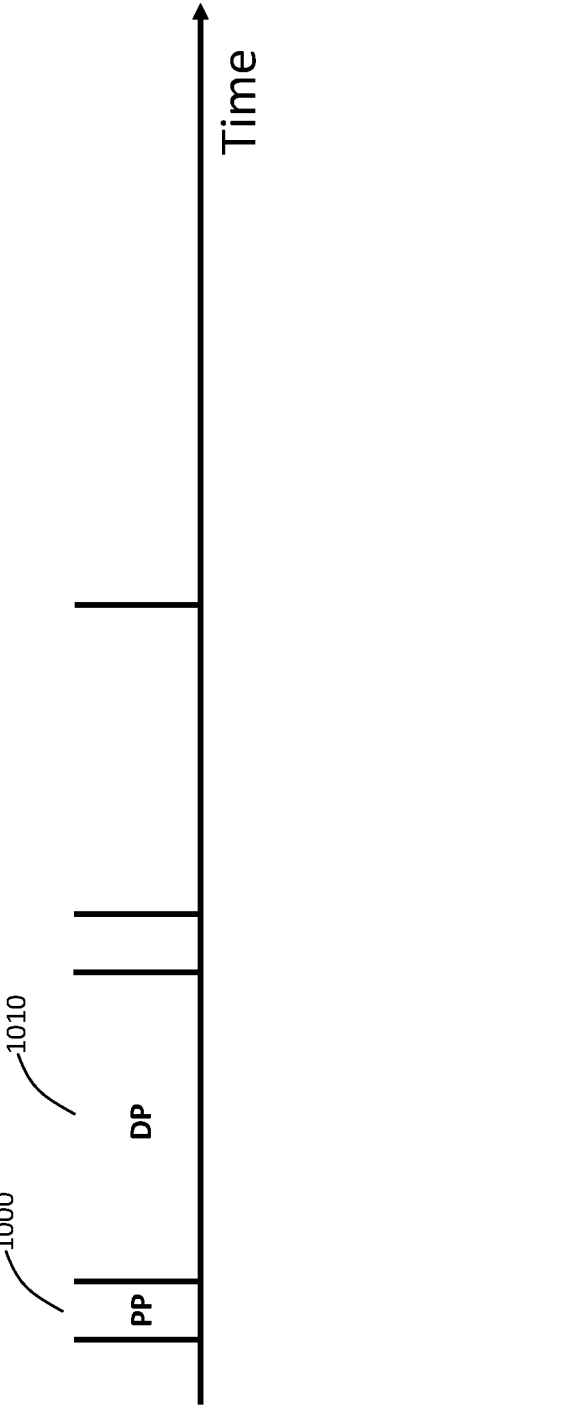
FIG. 10 illustrates time allocation for priority data delivery and regular data delivery for next generation wireless IoT networks.

Priority data has higher priority than regular data. However, the regular data delivery may contend resources with priority data delivery and therefore, delay the priority data. Therefore, data concentrator C may divide time into periods as shown in FIG. 10, where priority period (PP) 1000 is used for priority data delivery only and data period (DP) 1010 can be used for both regular data and priority data delivery. Data concentrator C can deliver such time period information to all data nodes in the network.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Although the present disclosure describes the invention by way of examples of preferred embodiments, it is understood that various other adaptations and modifications may be made within the spirit and scope of the invention. Therefore, it is the object of the appended claims to cover all such variations and modifications as come within the true spirit and scope of the invention.

We claim:

1. A node device used in a multi-hop heterogeneous wireless network including single-mode nodes and multi-mode nodes, comprising:
a transceiver configured to transmit and receive messages to discover regular data routes (D-Routes), wherein the discovered D-Routes form a destination oriented directed acyclic graph (DODAG) topology, wherein the transceiver is configured to receive and transmit regular data in the destination oriented directed acyclic graph (DODAG) topology and priority data in an optimal routing topology;
a memory configured to store computer executable programs and DODAG topology configuration parameters including a rank specified by Internet Protocol version 6 (IPv6) Routing Protocol for Low-Power and Lossy Networks (RPL) protocol and a communication mode (CM) and a multi-rate link count (MLC); and
a processor configured to perform steps of the computer executable programs, wherein the steps comprise:
discovering the D-Routes for all data nodes to form the DODAG topology by using the IPV6 Routing Protocol for Low-Power and Lossy Networks (RPL) protocol, wherein the RPL protocol uses a DODAG information object (DIO) message for an upward route discovery process and a destination advertisement object (DAO) message for a downward route discovery process;
discovering neighbor nodes while the discovering the D-Routes, wherein the processor determines another node as a neighbor node if the processor receives a broadcasted DIO message from the other node via the transceiver; and
sending accumulated traffic load (ATL) and identifiers of the neighbor nodes to a data concentrator via the DAO massage by using the transceiver.

2. The node device of claim 1, wherein the DIO message carries parameters specified by the RPL protocol and other parameters to select a parent (a route) in DODAG topology.

3. The node device of claim 2, wherein the DIO message carries a rank specified by the RPL protocol, the CM, and the MLC, wherein the CM is used to compute the MLC, wherein the MLC is used for route selection such that a data node selects a route with a larger MLC if ranks of candidate parents are same.

4. The node device of claim 3, wherein the data concentrator and a multi-mode data node set the CM to 2 and the single-mode data node sets the CM to 1, wherein the data concentrator sets the MLC to 0 and the data node increments the MLC by 1 if the data node is a multi-mode node and a transmitter of the DIO message is also a multi-mode node.

5. The node device of claim 1, wherein the DAO message carriers parameters specified by the RPL protocol and the ATL, identifiers of neighbor nodes and communication mode (CM) of the node, wherein the ATL of a data node n includes node's self-traffic load and accumulated children's traffic load computed as $$ATL(n) = LD(n) + \sum_{k=1}^{n_c} ATL(c_k^n),$$

where LD(n) is traffic load of node n, $n_c$ is the number of children of node n and $$c_k^n \ (k = 1, 2, \ldots, n_c)$$

are the children.

6. The node device of claim 1, wherein a data node transmits the priority data first if the node has both regular data and priority data.

7. A node device used in a multi-hop heterogeneous wireless network including a multi-mode concentrator, comprising:

a transceiver configured to transmit a destination oriented directed acyclic graph (DODAG) information object (DIO) message to initiate a regular data route (D-Route) discovery and receive a destination advertisement object (DAO) message to configure downward regular data routes (D-Routes) and obtain an accumulated traffic load (ATL) and neighbor information of data nodes to perform an optimal priority route (P-Route) discovery to build an optimal routing topology, wherein the transceiver is configured to transmit the optimal routing topology to the data nodes on discovered priority routes (P-Routes) to deliver priority data to the multi-mode concentrator, wherein the transceiver is configured to receive regular data in the DODAG topology and the priority data in the optimal routing topology;

a memory configured to store computer executable programs and parameters including a communication mode (CM), the ATL, a neighbor set, a degree of route overlap (DRO), an optimal priority route (P-Route) discovery; and a processor configured to perform steps of the computer executable programs, wherein the steps comprise:

discovering the D-Routes for all data nodes by using an Internet Protocol version 6 (IPv6) Routing Protocol for Low-Power and Lossy Networks (RPL) protocol, wherein the RPL protocol uses the DIO message for an upward route discovery process and a destination advertisement object (DAO) message for a downward route discovery process; and discovering optimal priority routes (P-Routes) by formulating a P-Route discovery problem as a non-linear optimization problem to minimize route overlap computed using the DRO, wherein the discovered optimal P-Routes are further optimized to minimize route transmission time and route length.

8. The node device of claim 7, wherein the P-Route discovery comprise:

discovering acyclic routes for each priority data node by using an acyclic route discovery method that identifies acyclic routes of a priority data node in a multi-hop heterogeneous wireless network; and discovering minimal overlap P-Routes in a multi-hop heterogeneous wireless network by using a minimal overlap P-Route discovery method via solving a non-linear optimization problem; and discovering a set of the minimal overlap P-Routes that minimizes total route transmission time in a multi-hop heterogeneous wireless network by solving a non-linear optimization problem; and discovering a set of the minimal overlap R-routes that minimizes total route length in a multi-hop heterogeneous wireless network by solving a non-linear optimization problem.

9. The node device of claim 8, wherein for a set of priority nodes $p_1, p_2, \ldots, p_M$ and a concentrator C, a route $$R_{p_i} = \left( f_0^i = p_i, f_1^i, f_2^i, \ldots, f_{h_i}^i, C \right)$$

from a priority node $p_i$ to the concentrator C is acyclic if and only if the route satisfies following conditions:

1.

$$f_j^i \neq f_k^i \ \forall \ j \neq k,$$

2.

$$f_j^i \neq C$$

for j=0, 1, . . . , $h_i$,

3.

$$f_{j+1}^i$$

is a neighbor of $$f_j^i$$

for j=0, 1, . . . , $h_i$−1,

4. Concentrator C is a neighbor of $$f_{h_i}^i,$$

and

5. Only $$f_{h_i}^i$$

is a neighbor of concentrator C.

10. The node device of claim 9, wherein for a route $$R_{p_i} = \left( f_0^i = p_i, f_1^i, f_2^i, \ldots, f_{h_i}^i, \right.$$

C) from a priority node $p_i$ to the concentrator C, the nodes $$p_i, f_1^i, f_2^i, \ldots, f_{h_i}^i$$

are named as forward nodes of route $R_{p_i}$ since they transmit or forward data in priority data delivery process.

11. The node device of claim 8, wherein the acyclic route discovery comprise:

building one 1-hop acyclic route for a priority node that is neighbor of concentrator; and discovering a set of acyclic routes for a priority node that is not a neighbor of concentrator by using a recursive extension and expansion method that recursively extends and expands each sub-route starting from a priority node, wherein a sub-route is a partial route that does reach concentrator yet.

12. The node device of claim 11, wherein the recursive sub-route extension and expansion comprise:

setting up one 1-hop sub-route from a priority node to each neighbor node; and recursively extending and expanding each 1-hop sub-route until sub-route reaches concentrator or the sub-route is deleted if it cannot be extended without cycle or the sub-route is expanded if it can be extended to multiple extendable nodes.

13. The node device of claim 8, wherein the minimal overlap priority routes (P-Routes) refers to a set of acyclic routes one route for each priority node that minimizes the degree of route overlap (DRO) metric defined as $$DRO\left(R_{p_1}, R_{p_2}, \dots, R_{p_M}\right) = \sum_{i=1}^{M} Len\left(R_{p_i}\right) - N_D\left(R_{p_1}, R_{p_2}, \dots, R_{p_M}\right),$$

where $p_1, p_2, \dots, p_M$ are priority data nodes in the network, $R_{p_1}, R_{p_2}, \dots, R_{p_M}$ are the respective routes, $Len(R_{p_1})$, $Len(R_{p_2})$, . . . , $Len(R_{p_M})$ are the respective route lengths and $N_D(R_{p_1}, R_{p_2}, \dots, R_{p_M})$ is the total number of the distinct forward nodes on the routes $R_{p_1}$, $R_{p_2}, \dots, R_{p_M}$.

14. The node device of claim 8, wherein the minimal overlap priority route (P-Route) discovery problem is formulated as a non-linear optimization problem to find routes $$R_{p_1}^o \in \mathbb{R}_{p_1}, R_{p_2}^o \in \mathbb{R}_{p_2}, \dots, R_{p_M}^o \in \mathbb{R}_{p_M}$$

for priority nodes $p_1, p_2, \dots, p_M$, respectively, such that $$DRO\left(R_{p_1}^o, R_{p_2}^o, \dots, R_{p_M}^o\right) =$$
$$\min_{R_{p_1} \in \mathbb{R}_{p_1}, R_{p_2} \in \mathbb{R}_{p_2}, \dots, R_{p_M} \in \mathbb{R}_{p_M}} DRO\left(R_{p_1}, R_{p_2}, \dots, R_{p_M}\right),$$

where $\mathbb{R}_{p_1}, \mathbb{R}_{p_2}, \dots, \mathbb{R}_{p_M}$ are acyclic route sets of priority nodes $p_1, p_2, \dots, p_M$, respectively.

15. The node device of claim 8, wherein the route transmission time (RTT) for a route $R_p=(f_0=p, f_1, \dots f_h, C)$ is computed as $$RTT(R_p) = \sum_{i=0}^{h} \frac{ETX(f_i) * ATL(f_i)}{r_i},$$

where $ETX(f_i)$ is the expected transmission count at node $f_i$ ($i=0, 1, 2, \dots, h$), $r_0, r_1, \dots, r_h$ are the highest link transmission rates at links $[f_0=p\to f_1]$, $[f_1\to f_2]$, . . . , $[f_h\to C]$, respectively.

16. The node device of claim 8, wherein the total route transmission time (RTT) for a set of minimal overlap routes $$R_{p_1}^{I_1} \in \mathbb{R}_{p_1}, R_{p_2}^{I_2} \in \mathbb{R}_{p_2}, \dots, R_{p_M}^{I_M} \in \mathbb{R}_{p_M}$$

is defined as $$RTT\left(R_{p_1}^{I_1}, R_{p_2}^{I_2}, \dots, R_{p_M}^{I_M}\right) = \sum_{k=1}^{M} RTT\left(R_{p_k}^{I_k}\right),$$

where $$\mathbb{I}_{min}^{ove}$$

denotes set of the minimal overlap route IDs with an element $$\{I_1, I_2, \dots, I_M\} \in \mathbb{I}_{min}^{ove}$$

identifies the minimal overlap routes $$R_{p_1}^{I_1} \in \mathbb{R}_{p_1}, R_{p_2}^{I_2} \in \mathbb{R}_{p_2}, \dots, R_{p_M}^{I_M} \in \mathbb{R}_{p_M}.$$

17. The node device of claim 8, wherein the minimal route transmission time (RTT) route discovery problem is formulated as a non-linear optimization problem to find a set of the minimal overlap routes $$R_{p_1}^{ot} \in \mathbb{R}_{p_1}, R_{p_2}^{ot} \in \mathbb{R}_{p_2}, \dots, R_{p_M}^{ot} \in \mathbb{R}_{p_M}$$

that minimize the total RTT:

$$RTT\left(R_{p_1}^{ot}, R_{p_2}^{ot}, \dots, R_{p_M}^{ot}\right) = \min_{\{I_1, I_2, \dots, I_M\} \in \mathbb{I}_{min}^{ove}} RTT\left(R_{p_1}^{I_1}, R_{p_2}^{I_2}, \dots, R_{p_M}^{I_M}\right),$$

where $$\mathbb{I}_{min}^{ove}$$

denotes set of the minimal overlap route IDs with an element $$\{I_1, I_2, \dots, I_M\} \in \mathbb{I}_{min}^{ove}$$

identifies the minimal overlap routes $$R_{p_1}^{I_1} \in \mathbb{R}_{p_1}, R_{p_2}^{I_2} \in \mathbb{R}_{p_2}, \dots, R_{p_M}^{I_M} \in \mathbb{R}_{p_M}.$$

18. The node device of claim 8, wherein the total route length for a set of minimal overlap routes $$R_{p_1}^{I_1} \in \mathbb{R}_{p_1}, R_{p_2}^{I_2} \in \mathbb{R}_{p_2}, \dots, R_{p_M}^{I_M} \in \mathbb{R}_{p_M}$$

identified by $$\{I_1, I_2, \dots, I_M\} \in \mathbb{I}_{min}^{ove}$$

is defined as $$Len\left(R_{p_1}^{I_1}, R_{p_2}^{I_2}, \dots, R_{p_M}^{I_M}\right) = \sum_{k=1}^{M} Len\left(R_{p_k}^{I_k}\right).$$

19. The node device of claim 8, wherein the minimal route length route discovery problem is formulated as a non-linear optimization problem to find a set of minimal overlap routes $$R_{p_1}^{oh} \in \mathbb{R}_{p_1}, R_{p_2}^{oh} \in \mathbb{R}_{p_2}, \ldots, R_{p_M}^{oh} \in \mathbb{R}_{p_M}$$

that minimize total route length:

$$Len\left(R_{p_1}^{oh}, R_{p_2}^{oh}, \ldots, R_{p_M}^{oh}\right) = \min_{\{I_1, I_2, \ldots, I_M\} \in \mathbb{I}_{min}^{ove}} Len\left(R_{p_1}^{I_1}, R_{p_2}^{I_2}, \ldots, R_{p_M}^{I_M}\right),$$

where $$\mathbb{I}_{min}^{ove}$$

denotes set of the minimal overlap route IDs with an element $$\{I_1, I_2, \ldots, I_M\} \in \mathbb{I}_{min}^{ove}$$

identifies the minimal overlap routes $$R_{p_1}^{I_1} \in \mathbb{R}_{p_1}, R_{p_2}^{I_2} \in \mathbb{R}_{p_2}, \ldots, R_{p_M}^{I_M} \in \mathbb{R}_{p_M}.$$

20. The node device of claim 7, wherein the concentrator delivers the discovered optimal priority routes (P-Routes) to data nodes on the P-Routes for priority data delivery, wherein a regular data node on a P-Route relays priority data using the P-Route, wherein a priority node transmits its priority data or relays priority data using P-Route.

\* \* \* \* \*